(12) United States Patent
Rosemarine et al.

(10) Patent No.: US 12,547,450 B2
(45) Date of Patent: Feb. 10, 2026

(54) READING DATA WITHIN A COMPRESSED DATA STREAM

(71) Applicant: Arm Limited, Cambridgeshire (GB)

(72) Inventors: Elliot Maurice Simon Rosemarine, London (GB); Jared Corey Smolens, Santa Clara, CA (US); Rune Holm, Oslo (NO); John Wakefield Brothers, III, Calistoga, CA (US); Jens Olson, San Jose, CA (US)

(73) Assignee: Arm Limited, Cambridge (GB)

( * ) Notice: Subject to any disclaimer, the term of this patent is extended or adjusted under 35 U.S.C. 154(b) by 475 days.

(21) Appl. No.: 18/099,594

(22) Filed: Jan. 20, 2023

(65) Prior Publication Data
US 2024/0248754 A1 Jul. 25, 2024

(51) Int. Cl.
*G06F 9/48* (2006.01)
(52) U.S. Cl.
CPC .................. *G06F 9/4881* (2013.01)
(58) Field of Classification Search
None
See application file for complete search history.

(56) References Cited

U.S. PATENT DOCUMENTS

| | | | | |
|---|---|---|---|---|
| 6,611,213 B1 * | 8/2003 | Bentley | ............ | G06T 9/005 341/51 |
| 6,674,373 B1 * | 1/2004 | Jones | ............ | H03M 7/3084 341/161 |
| 7,549,122 B2 * | 6/2009 | Miller | ............ | G06F 3/04842 715/764 |
| 7,733,249 B2 * | 6/2010 | Zhang | ............ | H04B 1/66 382/245 |
| 7,944,375 B2 * | 5/2011 | Abali | ............ | G06F 12/0804 711/146 |
| 8,548,962 B2 * | 10/2013 | Tapply | ............ | H03M 7/40 707/693 |
| 9,374,106 B2 * | 6/2016 | Agarwal | ............ | G06F 16/1744 |

(Continued)

FOREIGN PATENT DOCUMENTS

| | | |
|---|---|---|
| EP | 810552 B1 | 7/2003 |
| EP | 3944156 A1 | 1/2022 |
| WO | 2022038414 A1 | 2/2022 |

OTHER PUBLICATIONS

Combined Search and Examination Report dated Aug. 7, 2024 for GB Application No. GB2400298.2.

*Primary Examiner* — Van H Nguyen
(74) *Attorney, Agent, or Firm* — EIP US LLP

(57) ABSTRACT

A processor to generate position data indicative of a position within a compressed data stream, wherein, previously, in executing a task, data of the compressed data stream ending at the position has been read by the processor from storage storing the compressed data stream. After reading the data, the processor reads further data of the compressed data stream from the storage, in executing the task, the further data located beyond the position within the compressed data stream. After reading the further data, the processor reads, based on the position data, a portion of the compressed data stream from the storage, in executing the task, starting from the position within the compressed data stream. The processor decompresses the portion of the compressed data stream to generate decompressed data, in executing the task.

20 Claims, 5 Drawing Sheets

(56) References Cited

U.S. PATENT DOCUMENTS

| | | | |
|---|---|---|---|
| 9,386,126 B2* | 7/2016 | Callard | H04L 69/04 |
| 10,366,026 B1* | 7/2019 | Diamant | G06F 12/023 |
| 10,768,861 B1* | 9/2020 | Huang | H03M 7/6058 |
| 2007/0277036 A1* | 11/2007 | Chamberlain | G06F 9/4881 |
| | | | 713/171 |
| 2013/0198485 A1 | 8/2013 | Nystad et al. | |
| 2020/0272365 A1* | 8/2020 | Huang | G06F 16/1744 |
| 2021/0294662 A1* | 9/2021 | Goyal | G06F 16/9014 |
| 2023/0100586 A1* | 3/2023 | Kakaiya | G06F 9/544 |
| | | | 717/102 |

* cited by examiner

READING DATA WITHIN A COMPRESSED DATA STREAM

BACKGROUND

Technical Field

The present invention relates to methods, processors, and non-transitory computer-readable storage media for reading data within a compressed data stream.

Description of the Related Technology

It is known to compress data to reduce the size of the data to reduce bandwidth in transmission of the data and to reduce the size of a storage for storing the data. However, it can be challenging to access a particular piece of data within a compressed data stream.

SUMMARY

According to a first aspect of the present invention, there is provided a processor to: generate position data indicative of a position within a compressed data stream, wherein, previously, in executing a task, data of the compressed data stream ending at the position has been read by the processor from storage storing the compressed data stream; after reading the data, read further data of the compressed data stream from the storage, in executing the task, the further data located beyond the position within the compressed data stream; after reading the further data, read, based on the position data, a portion of the compressed data stream from the storage, in executing the task, starting from the position within the compressed data stream; and decompress the portion of the compressed data stream to generate decompressed data, in executing the task.

According to a second aspect of the present invention, there is provided a method comprising: generating position data indicative of a position within a compressed data stream, wherein, previously, in executing a task, data of the compressed data stream ending at the position has been read from storage storing the compressed data stream; after reading the data, reading further data of the compressed data stream from the storage, in executing the task, the further data located beyond the position within the compressed data stream; after reading the further data, reading, based on the position data, a portion of the compressed data stream from the storage, in executing the task, starting from the position within the compressed data stream; and decompressing the portion of the compressed data stream to generate decompressed data, in executing the task.

According to a third aspect of the present invention, there is provided a non-transitory computer-readable storage medium comprising a set of computer-readable instructions stored thereon which, when executed by at least one processor, are arranged to cause the at least one processor to: generate position data indicative of a position within a compressed data stream, wherein, previously, in executing a task, data of the compressed data stream ending at the position has been read by the processor from storage storing the compressed data stream; after reading the data, read further data of the compressed data stream from the storage, in executing the task, the further data located beyond the position within the compressed data stream; after reading the further data, read, based on the position data, a portion of the compressed data stream from the storage, in executing the task, starting from the position within the compressed data stream; and decompress the portion of the compressed data stream to generate decompressed data, in executing the task.

BRIEF DESCRIPTION OF THE DRAWINGS

Further features will become apparent from the following description of examples, which is made with reference to the accompanying drawings.

DETAILED DESCRIPTION

Figure 1:
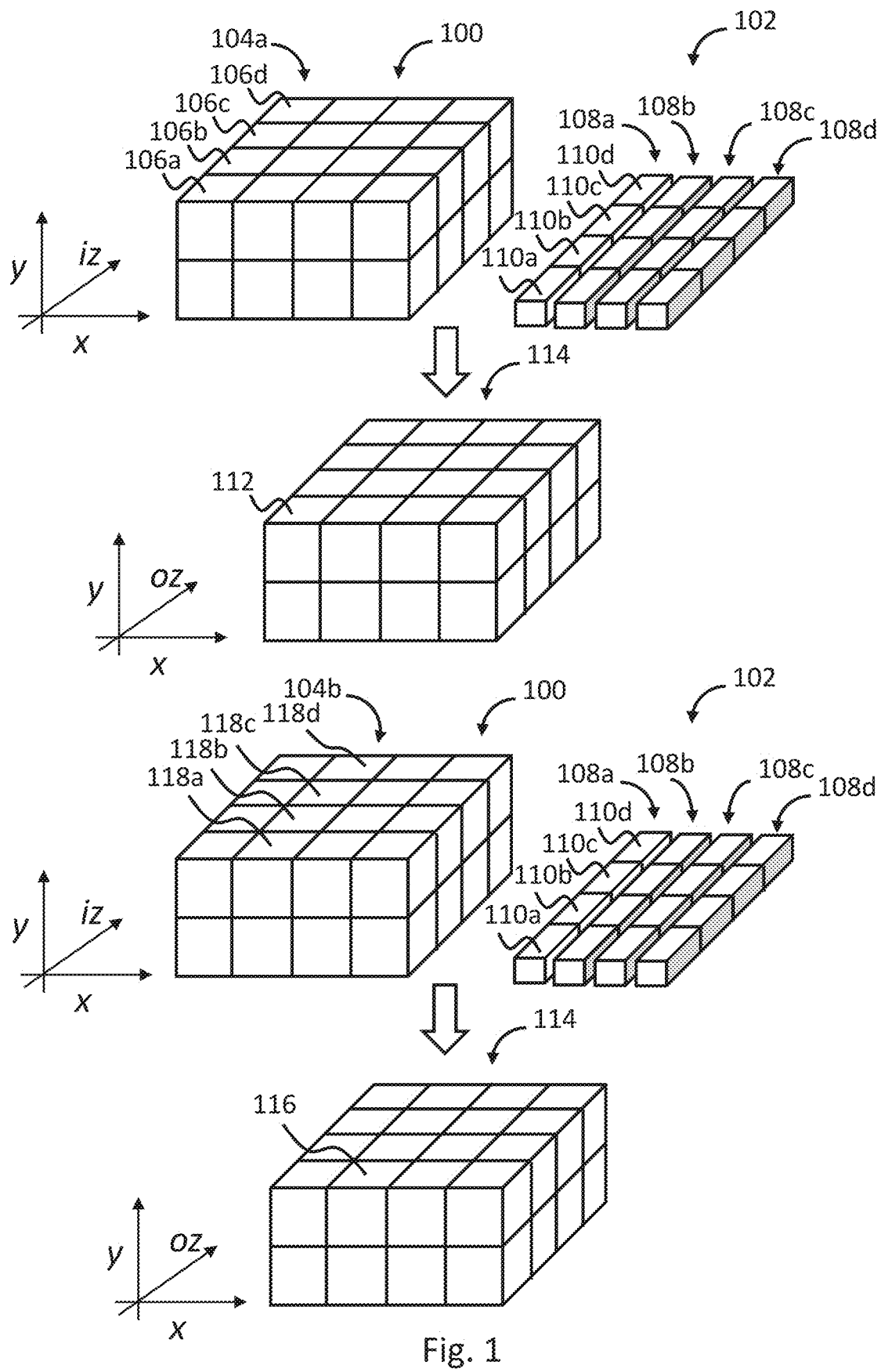
FIG. 1 is a schematic representation of a convolution of part of a tensor with neural network weights, according to examples.

First examples herein relate to a processor to: generate position data indicative of a position within a compressed data stream, wherein, previously, in executing a task, data of the compressed data stream ending at the position has been read by the processor from storage storing the compressed data stream; after reading the data, read further data of the compressed data stream from the storage, in executing the task, the further data located beyond the position within the compressed data stream; after reading the further data, read, based on the position data, a portion of the compressed data stream from the storage, in executing the task, starting from the position within the compressed data stream; and decompress the portion of the compressed data stream to generate decompressed data, in executing the task.

With this approach, a particular position within the compressed data stream can be accessed repeatedly in executing a task. This for example allows the processor to re-read data starting from that position, without having to read from the start of the compressed data stream each time. In other words, it is possible to jump straight to the desired position in order to read the data starting at that position. The data can thus be re-read in an efficient manner. This can be useful for certain data processing tasks, such as neural network tasks, that involve the re-use of the same data many times.

In some examples, the data comprises a prior portion of the compressed data stream, immediately prior to the portion of the compressed data stream, and the position corresponds to an end of the prior portion of the compressed data stream such that the end of the prior portion of the compressed data stream coincides with a start of the portion of the compressed data stream. This can simplify the identification of the start of the portion of the compressed data stream, by using position data representing both the end of the prior portion and the start of the portion.

In some examples, the further data comprises the portion of the compressed data stream and the processor is to: read the prior portion of the compressed data stream from the storage to read the data from the storage; and continue reading the compressed data stream from the end of the prior portion of the compressed data stream to read the further data from the storage. With this approach, reading of the compressed data stream can continue in order to read the portion of the compressed data stream for the first time, for example, which can simplify reading of this portion. Subsequently, the processor can jump to the position corresponding to the start of the portion, to read the portion again, e.g. without having to read the prior portion again. In this way, the portion can be efficiently re-read at a later time.

In some examples, the processor is to, after reading the portion of the compressed data stream, generate further position data indicative of a further position within the portion of the compressed data stream, for use in reading, from the storage, a further portion of the compressed data stream immediately subsequent to the portion of the compressed data stream, such that an end of the portion of the compressed data stream corresponds to a start of the further portion of the compressed data stream. This allows the processor to jump to the further position, e.g. instead of the position, to provide further flexibility in reading respective portions of the compressed data stream.

In some of these examples, the further position corresponds to the end of the portion of the compressed data stream and the processor is to: read the portion of the compressed data stream from the storage, up to a finish position that is before the end of the portion of the compressed data; and subsequently, read the further portion from the external storage based on the further position data, starting from the start of the further portion of the compressed data stream. This for example allows the further portion to be read in an efficient manner. For example, rather than having to continue reading the portion from the finish position until the start of the further portion, the processor can instead cease reading the compressed data stream at the finish position, and resume reading the compressed data stream at the start of the further portion.

The compressed data stream may be compressed with a variable encoding rate, for example using lossless compression. For example, the compressed data stream may represent neural network weights, which are static and unchanging, and may be used for multiple instances of neural network inferencing. Given the repeated re-use of the neural network weights, it is desirable to compress the neural network weights as much as possible. However, more aggressive compression tends to lead to a greater variance in the rate of encoding. In some cases, the neural network weights may be converted from a training format, such as fp32, to an inference format, such as int8, using a lossy quantization process, which can be accounted for during training and testing of the neural network. However, the neural network weights at time of inference are compressed in a lossless manner, as introducing loss at inference cannot be compensated for by training and would provide unpredictable results.

A variable encoding rate for example makes it challenging to read particular data within a compressed data stream, as it is typically not possible to predict the address of given data within the compressed data stream. One solution to this is to spread blocks of data, such as blocks of weights, out within the compressed data stream in a predictable manner. For example, each N weights (such as each 1024 weights), the weights realign is if there was no compression. So, if there are 2048 int8 weights (where each value is a byte) and an average compression rate of 75%, then the first 1024 weights would be packed into the first 256 bytes, there would then be a 768 byte gap in the compressed data stream and then the second 1024 weights would begin. This would allow a particular block of 1024 weights to be located in a predictable manner, as it would be possible to go straight to the start of a particular block to be processed without having to process prior block(s). However, compressing the compressed data stream in this manner does not reduce the footprint in memory of the compressed data stream. Other approaches involve decompressing the compressed data stream in order so as to obtain the given data. However, with the approaches herein, the position data for example allows a particular position within the compressed data stream to be recorded when that position is encountered (e.g. when data at that position is read by the processor). The processor can then use the position data to identify that particular position within the compressed data stream, e.g. so that data at that position can be read again, without having to read and decompress the entire compressed data stream up to that position. This allows the compressed data stream to occupy a reduced footprint in memory (reduced approximately equivalently to the rate of compression) compared to approaches that spread out blocks of data in a predictable manner, while facilitating the addressability into different portions of the stream.

The storage (which may for example be a single storage component or a storage system including a plurality of storage components) may be referred to as a first storage. The processor may store the decompressed data in second storage, which may be different from the first storage in which the compressed data stream is stored. A size of the second storage may be less than a size of the decompressed data. In such cases, the second storage may store less than all of the decompressed data at a time, so that a second storage with a smaller size can be used. In these cases, the portion of the compressed data stream that is decompressed to generate the decompressed data may nevertheless be easily accessed from the first storage at a later time, by reading the compressed data stream from the position indicated by the position data.

In some examples in which at least a part of the decompressed data is stored in second storage, the processor is to read the part of the decompressed data from the second storage a plurality of times over a time period, without reading a part of the portion of the compressed data stream corresponding to the part of the decompressed data from the first storage in the time period. The part of the decompressed data stored in the second storage can thus be re-read from the second storage during the time period. Re-reading the part of the decompressed data from the second storage may be more efficient than repeatedly retrieving and decompressing the portion of the compressed data stream from the first storage, e.g. by reducing external memory accesses that may occur if the first storage is external to the processor and the second storage is internal storage of the processor.

The compressed data stream may comprise compressed weight data representative of neural network weights, and the task may comprise a neural processing task. The approaches herein may therefore be used to repeatedly access neural network weights so as to implement neural network processing in an efficient manner. In some of these examples, the processor is to, in executing the task: obtain tensor data representative of at least a part of a multidimensional tensor; and process the decompressed data with the tensor data to convolve at least the part of the multidimensional tensor with corresponding weights of the neural network weights. Neural network processing may involve the convolution of the same neural network weights with a plurality of different blocks of a multi-dimensional tensor, and the methods herein for example allow the neural network weights to be read repeatedly in order to efficiently perform convolutions such as this.

In some of these examples, the decompressed data comprises first weight data representing a first part of a set of decompressed neural network weight blocks, and the processor is to, in executing the task: process the first weight data with first tensor data representing a first part of a set of blocks of a multi-dimensional tensor, to convolve a respective weight block of the first part of the set of decompressed neural network weight blocks with a corresponding input block of the first part of the set of blocks of the multi-dimensional tensor, wherein each block of the set of blocks of the multi-dimensional tensor is at a first location in a first dimension of the multi-dimensional tensor. In this way, the appropriate neural network weights and tensor blocks can be convolved in order to implement at least part of a neural processing task.

In some examples in which the storage storing the compressed data stream is a first storage, the processor is to, in executing the task: store the first weight data in second storage, the first weight data corresponding to a part of the decompressed data; replace, in the second storage, the first weight data with second weight data corresponding to a further part of the decompressed data, the second weight data representing a second part of the set of decompressed neural network weight blocks; read the second weight data from the second storage; and process the second weight data with second tensor data representing a second part of the set of blocks of the multi-dimensional tensor, to convolve a respective weight block of the second set of decompressed neural network weight blocks with a corresponding input block of the second part of the set of blocks of the multi-dimensional tensor. With this approach, a smaller storage may be used as the second storage. For example, the second storage may have a size that is too small to store the entire set of decompressed neural network weight blocks but may nevertheless be sufficiently large to store a part of a set of decompressed neural network weight blocks for convolving with a corresponding portion of a multi-dimensional tensor.

In some examples, the processor is to, in executing the task, after processing the second weight data with the second tensor data: read the second weight data from the second storage; and process the second weight data with third tensor data representing at least a part of a further set of blocks of the multi-dimensional tensor, to convolve a respective weight block of the second set of decompressed neural network weight blocks with a corresponding input block of the part of the further set of blocks of the multi-dimensional tensor, wherein each block of the further set of blocks of the multi-dimensional is at a second location in the first dimension of the multi-dimensional tensor. In this way, the second weight data that is already stored in the second storage can be re-used for a further convolution. This is for example more efficient than other approaches that involve repeatedly storing the same data in the second storage each time that data is to be processed.

In some examples, to process the second weight data with the third tensor data, the processor is to obtain a second portion of a tensor data stream representative of at least the further set of blocks of the multi-dimensional tensor, the second portion of the tensor stream comprising the third tensor data and being subsequent to a first portion of the tensor data stream within the tensor data stream, for convolving a respective input block of the part of the further set of blocks of the multi-dimensional tensor represented by the third tensor data with a corresponding weight block of the second set of decompressed neural network weight blocks. In this way, processing of the tensor data stream can be reordered to corresponding to reordering of the compressed data stream to allow for efficient use of the second storage. In these examples, the second weight data for example remains in the second storage after it has been processed with the second tensor data, so it can be processed again with the third tensor data (representing at least a part of a different set of blocks of the multi-dimensional tensor than the second tensor data). It is to be appreciated that reordering in this way may also be performed for pre-processing of the tensor data stream (if performed), such as processing of the tensor data stream between reading of the tensor data stream and processing of the tensor data stream using a convolution operation. For example, two tensor data streams representing two multi-dimensional tensors may be read, an elementwise add may be performed and the resulting multi-dimensional tensor may be used as an input to the convolution operation (e.g. for convolution with respective weights represented by the compressed data stream). In this case, if the convolution operation is to be performed in a reordered manner (e.g. starting with a convolution operation using weight block(s) that are not at the start of a particular portion of the compressed data stream, for example so as to re-use weight block(s) that remain in storage from a prior convolution operation), it can be more efficient to read the two tensor data streams and perform the elementwise add of the two tensors represented by the tensor data streams in a correspondingly reordered manner. In such cases, the tensor data stream(s) are typically not compressed, which simplifies the identification and obtaining of a particular portion of a given tensor data stream, such as the third tensor data.

In some examples, the processor is to generate the position data after reading the data ending at the position for a first time, without having read the data ending at the position before the first time. This for example allows the position data to be used for reading the portion of the compressed data stream for each subsequent time it is to be read from the first storage.

In some examples, the processor is to generate the position data in response to determining, based on a data generation indicator indicative of whether the position data has previously been generated for the position, that the position data has not previously been generated for the position. This can avoid unnecessary repeated storing of the same data (the position data) each time data at the position is read from the first storage.

In some examples, the processor comprises local storage (which may be referred to in examples herein as second storage), and the processor is to store at least a part of the decompressed data in the local storage. By storing the part of the decompressed data in the second (local) storage, the part of the decompressed data may be accessed more efficiently than from external storage.

Second examples herein relate to a method comprising: generating position data indicative of a position within a compressed data stream, wherein, previously, in executing a task, data of the compressed data stream ending at the position has been read from storage storing the compressed data stream; after reading the data, reading further data of the compressed data stream from the storage, in executing the task, the further data located beyond the position within the compressed data stream; after reading the further data, reading, based on the position data, a portion of the compressed data stream from the storage, in executing the task, starting from the position within the compressed data stream; and decompressing the portion of the compressed data stream to generate decompressed data, in executing the task. As explained above with reference to the first examples, this for example allows a particular position within the compressed data stream to be accessed repeatedly in executing a task, so as to re-read data starting from that position in an efficient manner.

In examples, the data comprises a prior portion of the compressed data stream, immediately prior to the portion of the compressed data stream and the position corresponds to an end of the prior portion of the compressed data stream such that the end of the prior portion of the compressed data stream coincides with a start of the portion of the compressed data stream. In some of these examples, the further data comprises the portion of the compressed data stream and method further comprises: reading the prior portion of the compressed data stream from the storage to read the data from the storage; and continuing reading the compressed data stream from the end of the prior portion of the compressed data stream to read the further data from the storage. These approaches for example allow the reading of the portion of the compressed data stream to be performed more straightforwardly, e.g. the first time the portion is read, by continuing reading of the compressed data stream. The portion can then be re-read by reading from the position indicated by the position data.

In some examples, the method further comprises: after reading the portion of the compressed data stream, generating further position data indicative of an end of the portion of the compressed data stream, wherein the end of the portion of the compressed data stream corresponds to a start of a further portion of the compressed data stream immediately subsequent to the portion of the compressed data stream; re-reading part of the portion of the compressed data stream from the storage, up to a finish position that is before the end of the portion of the compressed data stream; and subsequently, reading the further portion from the storage based on the further position data, starting from the start of the further portion of the compressed data stream. This for example provides further flexibility in reading portions of the compressed data stream. The reading of the compressed data stream can for example be performed more efficiently by moving from the finish position to the start of the further portion without having to read a part of the compressed data stream between the finish position and the start of the further portion.

According to third examples, there is provided a non-transitory computer-readable storage medium comprising a set of computer-readable instructions stored thereon which, when executed by at least one processor, are arranged to cause the at least one processor to perform any aspects in accordance with the first examples. As explained above with reference to the first examples, these approaches for example improve the efficiency of reading a compressed data stream in executing a task.

To put the examples herein into context, an example of a task comprising convolution of part of a tensor 100 with neural network weights 102 will be described with reference to FIG. 1. However, it is to be appreciated that the examples herein may equally be applied to other types of task, such as other neural network processing or other tasks that do not involve a neural network.

As used herein, the term "tensor" is to be considered to refer to a multi-dimensional tensor. A tensor is an array of elements, such as an array of same-typed scalar elements. In the example of FIG. 1, a tensor 100 is convolved with neural network weights 102 (which may be referred to herein merely as "weights" for brevity) in executing a task, which in this example is a neural processing task. Neural networks can be used for processes such as machine learning, computer vision, and natural language processing operations. A neural network may operate upon suitable input data (e.g. such as an image or sound data, which may be in the form of a tensor such as the tensor 100 of FIG. 1) to ultimately provide a desired output (e.g. an identification of an object within an image, or a spoken word within a sound clip, or other useful output inferred from the input data). This process is usually known as "inferencing" or "classification." In a graphics (image) processing context, neural network processing may also be used for image enhancement ("de-noising"), segmentation, "anti-aliasing," super-sampling, etc., in which case a suitable input image (e.g. represented as a tensor) may be processed to provide a desired output image (which may also be represented as a tensor).

A neural network will typically process the input data according to a network of operators, each operator performing a particular operation. The operations will generally be performed sequentially to produce desired output data (e.g. a classification based on the image or sound data). Each operation may be referred to as a "layer" of neural network processing. Hence, neural network processing may comprise a sequence of "layers" of processing, such that the output from each layer is used as an input to a next layer of processing. Each layer for example processes an input feature map by convolving the input feature map with a set of weights to generate an output feature map, which is used as the input feature map for the next layer. The term "feature map" is used generically herein to refer to either an input feature map or an output feature map. FIG. 1 shows schematically the processing of a particular layer of a neural network according to example, in which the tensor 100 represents an input feature map.

The weights of a neural network are for example a static data set, obtained before the inferencing is performed by a training process. The weights may thus be re-used for multiple instances of inferencing, e.g. for multiple different input feature maps. In contrast, the tensor 100 is provided at run-time, and will vary depending on the input data for which the inferencing is to be performed. As the weights are static and re-useable, it is desirable to compress the weights to reduce the resources required for storage of and access to the weights. For example, lossless compression may be used to compress the weights to improve reproducibility and accuracy (although it is to be appreciated that a lossy quantization may be applied before lossless compression).

In order to efficiently implement neural network processing, examples herein may involve dividing the processing to be performed into smaller operations, each performed on a subset of data to be processed, before subsequently combining each of the outputs to obtain an overall output. For example, a tensor representing an input feature map which is to undergo inferencing may be split into stripes (which are e.g. portions of the tensor with a limited size in one dimension and an unlimited size in each other dimension). Each stripe may be taken to correspond to a job. A determination of how to efficiently divide a tensor into stripes may be performed by a compiler of a data processing system comprising a processor to perform at least part of the neural network processing. A handling unit of the processor may then further divide a job into tasks. If the processor is a multi-core processor, there may be one task per core. The handling unit, or another suitable unit of the processor, may then divide each task into blocks of work. Each block of work may for example correspond to a block of a stripe of a tensor. In these examples, each task may thus be considered to correspond to a different set of blocks, respectively. In examples such as this, the division of the job is performed by the processor, e.g. in hardware. However, the size of the tasks and blocks may be determined by the compiler. These sizes may be used by the compiler when compressing the weights, so that the weights are compressed in blocks in an appropriate order to match the order in which the blocks of the tensor are to be processed. In general, a task may be considered to correspond to processing to be undertaken to achieve a particular aim. Tasks may be defined at various levels of specificity in various examples. For example, while in this case a task involves the processing of a set of blocks using a neural network, in other examples, a task may involve the processing of an entire tensor or an entire stripe of a tensor, or the processing of a tensor or part of a tensor using a portion of a neural network rather than an entire neural network. It is to be appreciated that, in further examples, a task need not involve neural network processing and may instead involve a different type of data processing.

Certain types of lossless compression, such as various types that are suitable for heavily compressing data, typically tightly compress the data using a variable encoding rate. As explained above, this can make it challenging, if not impossible, to obtain a desired piece of data from within a compressed data stream, as the address of any given piece of data is typically unknown in advance. To address this, other approaches involve decompressing an entire compressed data stream (e.g. comprising compressed weight data representative of neural network weights) linearly, in order. However, this may be an inefficient way of accessing weights partway through the compressed data stream. As explained above, examples herein allow a portion of a compressed data stream to be read from storage in a more efficient manner, starting from a particular position within the compressed data stream that has been read previously by the processor, based on position data indicative of the position. This is discussed further below with reference to FIGS. 2 to 4.

Referring back to FIG. 1, a convolution between a four-dimensional array of weights 102 with a three-dimensional tensor 100 may be considered to be a series of nested loops, covering: weight kernel x and y axes, an input channel (iz) axis, output x and y axes and an output channel (oz) axis. The x, y, iz and oz axes are shown schematically in FIG. 1. A block of processing may include some or all of these axes. It is to be appreciated, though, that FIG. 1 is an example for illustration and in practice a convolution may include more or fewer dimensions than this. For example, weights and/or tensors to be convolved with each other may have a different number than three or four dimensions. In an example convolution (such as a convolution of a 3×3 kernel of weights, with a size of 3 in both the x and y dimensions, with a corresponding set of tensor elements), a processing block will include the whole of the weight kernel x and y axes, although this may not be the case for larger weight kernels. The processing block in this example includes a subrange of each of the other axes (although in some other examples, with a smaller convolution, a block may include the entire range of some or all of the other axes).

In a convolution operation in accordance with FIG. 1, weights do not vary along the output x and y axes, so a weight block may be considered to contain the entire output x and y axes. A weight block thus typically contains a subrange of the output and input z axes (labelled herein as oz and iz, respectively) and the entire weight kernel x and y axes and output x and y axes. In this example, weights, and thus weight blocks, are ordered contiguously in memory to match the order in which the blocks of work are to be executed (as determined by the compiler).

In FIG. 1, the tensor 100 to be convolved with the weights 102 (which are e.g. decompressed neural network weights) includes a first set of blocks 104a (which in this example are input blocks). In this case, each block of the first set of blocks 104a occupies the same x and y regions. However, each block of the first set of blocks 104a is at a different position in the iz dimension. The first set of blocks 104a includes a first input block 106a at a first set of iz positions, a second input block 106b at a second set of iz positions, a third input block 106c at a third set of iz positions and a fourth input block 106d at a fourth set of iz positions. Each of the input blocks 106a-106d of the first set of blocks 104a includes elements at four iz positions, i.e. so that each input block 106a-106d of the first set of blocks 104a covers 4 input channels, giving 16 input channels in total (where the input channel axis corresponds to the iz axis). Each of the input blocks 106a-106d of the first set of blocks 104a may be represented by corresponding tensor data, and may be taken to correspond to a respective part of the (first) set of blocks 104a. For example, the first input block 106a may be represented by first tensor data and may be taken to correspond to a first part of the first set of blocks 104a.

In this example, the weights 102 include four sets of decompressed neural network weight blocks 108a-108d, which may be referred to merely as sets of weight blocks 108a-108d. Each set of weight blocks includes four weight blocks. In FIG. 1, solely the weight blocks 110a-110d of the first set of weight blocks 108a is labelled, for clarity. Similarly to the blocks of the tensor 100, each weight block of a given set of weight blocks occupies the same x and y regions but a different respective position in the iz dimension. Each weight block may be represented by respective weight data, and may be considered to represent a respective part of a given set of decompressed neural network weight blocks. For example, a first weight block 110a of the first set of weight blocks 108a may be represented by first weight data, and may be taken to represent a first part of a (first) set of decompressed neural network weight blocks 108a.

In FIG. 1, a convolution operation to generate a first output block 112 of an output tensor 114 involves convolving: the first input block 106a of the first set of blocks 104a with the first weight block 110a of the first set of weight blocks 108a; the second input block 106b of the first set of blocks 104a with the second weight block 110b of the first set of weight blocks 108a; the third input block 106c of the first set of blocks 104a with the third weight block 110c of the first set of weight blocks 108a; and the fourth input block 106d of the first set of blocks 104a with the fourth weight block 110d of the first set of weight blocks 108a.

In this example, each weight block of the first set of weight blocks 108a is thus convolved in turn with a corresponding block of the first set of blocks 104a of the tensor 100. To simplify the obtaining of the weight blocks from storage, the weight blocks 110a-110d may be ordered contiguously in memory, i.e. so that the first weight block 110a of the first set of weight blocks 108a immediately precedes the second weight block 110b of the first set of weight blocks 108a in the storage, and so on. Similarly, compressed data representing the first to fourth weight blocks 110a-110b of the first set of weight blocks 108a may be ordered contiguously within a compressed data stream, which may be stored more efficiently than uncompressed weights.

A second output block 116 of the output tensor 114 may be obtained in a corresponding fashion. The second output block 116 covers the same y and oz positions but is at an immediately subsequent x position to the first output block 112. Hence, to obtain the second output block 116, each (input) block 118a-118d of a second set of (input) blocks 104b of the tensor 100 is convolved with a corresponding weight block of the first set of weight blocks 108a. In this case, the second set of blocks 104b includes blocks 118a-118d at the same y and iz positions but at an immediately subsequent x position to the first set of blocks 104a of the tensor 100. The convolution operation to generate the second output block 116 thus involves convolving: the first input block 118a of the second set of blocks 104b with the first weight block 110a of the first set of weight blocks 108a; the second input block 118b of the second set of blocks 104b with the second weight block 110b of the first set of weight blocks 108a; the third input block 118c of the second set of blocks 104b with the third weight block 110c of the first set of weight blocks 108a; and the fourth input block 118d of the second set of blocks 104b with the fourth weight block 110d of the first set of weight blocks 108a.

Third and fourth output blocks of the output tensor 114, at the same y and oz positions but successive x positions to the second output block 116, may be obtained in a corresponding manner, by convolving blocks of third and fourth sets of blocks of the tensor 100, at the same y and iz positions but successive x positions to the second set of blocks 104b, with corresponding weight blocks of the first set of weight blocks 108a. Similarly, an output block of the output tensor 114 at a subsequent y position but the same x and oz position as the first output block 112 may be obtained in a corresponding way, by convolving blocks of a set of blocks of the tensor 100 at the same x and iz positions but a subsequent y position to the first set of blocks 104a, with corresponding weight blocks of the first set of weight blocks 108a. The same approach may be applied to obtain the output blocks of the output tensor 114 in the same x-y plane as the first and second output blocks 112, 116. It can thus be seen that the first set of weights 108a is re-used many times to obtain these output blocks. It is hence desirable to be able to efficiently re-read particular weights in order to perform processing such as this.

Output blocks in successive x-y planes to the first and second output blocks 112, 116 may be obtained in a similar manner but using successive sets of weight blocks 108b-108d for each plane. Each of these further sets of weight blocks 108b-108d may similarly be re-read many times in order to perform this processing. It is to be appreciated that, in practice, a tensor to be processed and/or the weights to be convolved with a particular tensor may be much larger than those shown in FIG. 1.

Figure 2:
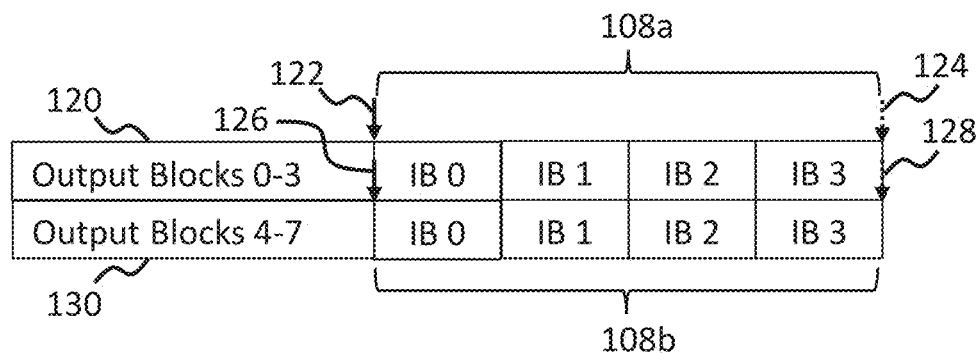
FIG. 2 is a schematic representation of blocks of neural network weights to be convolved with corresponding input blocks of a tensor to obtain particular output blocks, according to examples.

FIG. 2 is a schematic representation of blocks of weights to be convolved with corresponding input blocks of a tensor to obtain particular output blocks, according to examples. Similarly to FIG. 1, the weights and weight blocks referred to with reference to FIG. 2 are decompressed neural network weights and weight blocks, respectively, unless otherwise stated. Features of FIG. 2 that are the same as corresponding features of FIG. 1 are labelled with the same reference numerals; corresponding descriptions are to be taken to apply. In FIG. 1, the tensor 100 includes two rows in the y dimension. However, for simplicity, the example of FIG. 2 is the same as that of FIG. 1 but with only a single row in the y dimension (corresponding to the upper row in FIG. 1 in the y dimension).

As explained with reference to FIG. 1, obtaining output blocks of an output tensor 114 which are at the same y and oz positions but a different x position to the first output block 112 involves convolving different input blocks of the tensor 100 (at different x positions) with the same set of weight blocks (the first set of weight blocks 108a). It may hence be more efficient to re-use the first set of weight blocks 108a to obtain subsequent output blocks at the same y and oz positions but a subsequent x position before using other sets of weight blocks to obtain other output blocks. This may allow the first set of weight blocks 108a to be retained in storage (e.g. after decompression, for example in local storage of the processor) to a greater extent than otherwise, even if the storage is not large enough to store the entire first set of weight blocks 108a.

In the example of FIG. 2, the processing is performed in this order, with compressed weight blocks of the first set of weight blocks 108a stored contiguously in a compressed data stream. In this example, to obtain a first set of four output blocks 120 (e.g. corresponding to a top row of output blocks in the output tensor 114 of FIG. 1 in a first x-y plane, including the first and second output blocks 112, 116, with each of the output blocks being at the same y and oz positions but a different x position) corresponding input blocks of the tensor 100 of FIG. 1 are convolved with corresponding weight blocks of the first set of weight blocks 108a. The output blocks of the first set 120 are labelled in FIG. 2 as output blocks 0-3. In FIG. 2, the weight blocks of the first set of weight blocks 108a are labelled as IB 0 to IB 3 respectively, and correspond to weight blocks 110a-110d of the first set of weight blocks 108a shown in FIG. 1.

In this example, the first set of weight blocks 108a is used four times, to generate output blocks 0-3. Compressed weight data representing the first set of weight blocks 108a, which may be referred to as data of the compressed data stream, starts at a start position 122 within a compressed data stream and ends at an end position 124 within the compressed data stream, which corresponds to a start position 126 of a further portion of the compressed data stream, representing a second set of weight blocks 108b. In FIG. 2, the compressed weight data representing the first set of weight blocks 108a starts at the beginning of the compressed data stream, so it is straightforward to re-read the first set of weight blocks 108a from storage storing the compressed data stream for each output block after output block 0, by starting from the beginning of the compressed data stream. However, it may be challenging to determine the position within the compressed data stream corresponding to subsequent sets of weight blocks (such as the second set of weight blocks 108b), e.g. if the data representing the weights is compressed using a contiguous variable rate stream.

In the example of FIG. 2, after generating the first set of four output blocks 120, which in this case span an entire first x-y plane at a first position in the oz dimension, a second set of four output blocks 130 is generated, for a second, subsequent x-y plane at a second position in the oz dimension. In this example, to obtain the second set of four output blocks 130 (e.g. corresponding to a top row of output blocks in the output tensor 114 of FIG. 1 in a second x-y plane, at a subsequent oz position to the first x-y plane of the first set of four output blocks 120) corresponding input blocks of the tensor 100 of FIG. 1 are convolved with corresponding weight blocks of the second set of weight blocks 108b. This is merely an example, though, and in other cases the x and y dimensions may be divided differently in order to generate respective sets of output blocks. For example, different tasks may involve the processing of different x and y ranges. In such cases, these tasks may be performed simultaneously using different processors, in FIG. 2, the output blocks of the second set 130 are labelled as output blocks 4-7. In FIG. 2, the weight blocks of the second set of weight blocks 108b are also labelled as IB 0 to IB 3 respectively, and correspond to weight blocks of the second set of weight blocks 108b shown in FIG. 1.

In this case, after reading and decompressing a portion of the compressed data stream corresponding to weight blocks IB 0 to IB 3 of the second set of weight blocks 108b, which e.g. correspond to further data of the compressed data stream, it is desired to re-read (and re-decompress) the portion of the compressed data stream corresponding to these weight blocks again. In order to efficiently access a position within the compressed data stream corresponding to the start of the second set of weight blocks 108b (i.e. the position 126 of FIG. 2), position data indicative of a position within the compressed data stream, in this case corresponding to the end position 124 of the first set of weight blocks 108a (which corresponds to the start position 126 of the second set of weight blocks 108b) is stored. The position data is for example stored when a prior portion of the compressed data stream representing the first set of weight blocks 108a is read from storage for the first time (although it may alternatively or additionally be stored at another time in some examples). By storing the position data, the processor can begin to read a portion of the compressed data stream (in this case corresponding to the second set of weight blocks 108b) from the start of the portion (corresponding to the start position 126), without having to read the compressed data stream from the start, i.e. without having to re-read the prior portion. The position data may indicate the position within the compressed data stream in any suitable way. For example, the position data may represent a memory address of the position or a pointer to the memory address. In other examples, in which the compressed data stream is compressed using run length encoding, the position data may represent a number of consecutive identical values for each of one or more different values within the compressed data stream prior to the position.

In some examples, a current state of a decompression unit of the processor for decompressing the compressed data stream may be stored upon reaching a particular position within the compressed data stream (such as the end position 124). The state may include an indication or be otherwise representative of the position within the compression stream, and the state of various decompression symbols. The decompression symbols are for example mode bits indicating a current mode of execution, for example to enable the state to be carried across sequential blocks in the compressed data stream. State data representing the state of the decompression unit at a particular position within the compressed data stream may thus include the position data indicative of the position within the compressed data stream, which is e.g. a position that has been read by the processor (so that the position, and the data corresponding to the position, is available to the processor). In some cases, the position to be saved may be located in the middle of a compression symbol. For example, if the compressed data stream is encoded using run-length encoding, a run of 10 zeroes may be encoded in one symbol. Four of those zeroes might belong to the end of a particular set of weight blocks and the next six of those zeroes might belong to the beginning of a subsequent set of weight blocks, for example.

In this case, position data indicative of the position of the start of the subsequent set of weight blocks within the compressed data stream may indicate both the location of the end of the run of 10 zeroes within the compressed data stream and that six zeroes need to be included at the start of the data at this position. In other words, the position data indicates that the compressed data stream is to be read from the end of the run of 10 zeroes and that six zeroes are to be added on to the start of the compressed data stream, as this position (i.e. the end of the run of 10 zeroes, plus 6 zeros added to the start) effectively corresponds to the start of the subsequent set of weight blocks within the compressed data stream. In examples such as this, the position data may thus represent the state of the decompression unit.

When the processor is to re-read a portion of the compressed data stream that has been read previously, the processor can take this as a trigger to return to the position corresponding to the start of the portion of the compressed data stream, based on the position data. In other words, due to the position data, the position within the compressed data stream corresponding to the start of the data that is to be re-read was known in advance of re-reading this data. The processor can then re-read the portion of the compressed data stream from storage storing the compressed data stream. The portion of the compressed data stream can then be decompressed and stored in further storage, such as local storage of the processor, for efficient access in future.

After starting to re-read the portion of the compressed data stream corresponding to the second set of weight blocks 108b for a final time, in this case to produce output block 7, the processor may continue to read (and decompress) the compressed data stream until a further end position 128 corresponding to the end of the second set of weight blocks 108b. Although not shown in FIG. 2, it is to be appreciated that the further end position 128 may correspond to a start of a third set of weight blocks 108c (shown in FIG. 1). Position data representing the further end position 128 may thus be stored in order to efficiently re-read the third set of weight blocks 108c to generate a third set of output blocks. As explained above, the position data may form part of state data representing a state of a decompression unit for decompressing the compressed data stream at the further end position 128.

Reading of the compressed data stream to obtain a further portion of the compressed data stream, corresponding to a third set of weight blocks 108c (shown in FIG. 1) can then continue from the further end position 128. The further portion can be re-read (and re-decompressed) repeatedly as desired, e.g. using the position data representing the further end position 128, in order to repeatedly fetch the further portion for convolving respective weight blocks of the third set of weight blocks 108c with corresponding input blocks, so as to generate a third set of output blocks.

Figure 3:
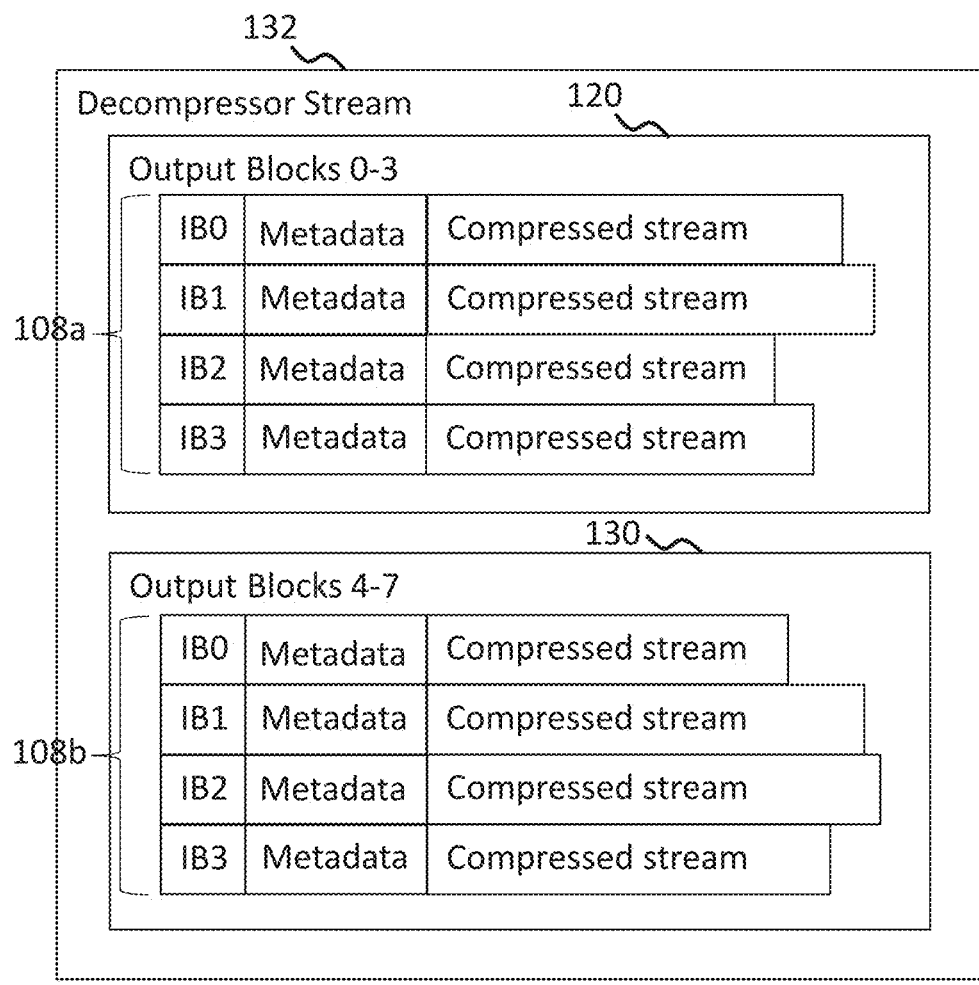
FIG. 3 is a schematic diagram of a decompressor stream, according to examples.

FIG. 3 is a schematic diagram of a decompressor stream 132, according to examples. FIG. 3 illustrates the first and second output blocks 120, 130 of FIG. 2 in more detail. As can be seen in FIG. 3, in this example the individual weight blocks (labelled IB 0 to IB 3) of each of the first and second sets of weight blocks 108a, 108b include metadata as well as a compressed stream of data. Each of the weight blocks IB0 to IB 3 of the first and second sets of weight blocks 108a, 108b are of a different size due to including compressed streams of different sizes due to variable rate encoding. As explained above, the use of position data nevertheless allows the position corresponding to the start of a particular set of weight blocks to be straightforwardly identified, so a portion of a compressed data stream corresponding to the set of weight blocks can be read (and decompressed) in an efficient manner. In particular, this allows the portion of the compressed data stream to be read without reading more data than is necessary in order to perform the task. Without this approach, to avoid overfetching of data (which is wasteful), the processor (e.g. a weight fetcher of the processor, discussed further below) would instead have to wait for all symbols that fit within a cache line of the processor to be decoded before deciding to fetch another cache line's worth of symbols. This would potentially expose the memory latency between fetching respective cache lines of data, and may make processing very slow. However, as the processor in examples herein fetches data in accordance with the position data, this for example allows the processor to read ahead and fetch just enough data to decode particular data to be processed in executing the task.

Obtaining a portion of a compressed data stream from storage (which may be referred to as first storage) can consume memory bandwidth, which is typically a scarce resource, and can be power intensive. Decompressing data, such as compressed weight data, may also be computationally and power intensive. As explained above, weights are typically re-used a plurality of times in the implementation of a neural network. For example, as shown in FIG. 1, the same weights are used to obtain different output blocks in a given x-y plane of an output tensor. In the examples of FIGS. 1 and 2, there were four output blocks for each x-y plane, each of which was generated using the same set of weights. After obtaining the output blocks for a given x-y plane, the next set of output blocks, for the next x-y plane (at a subsequent oz position) may be obtained, as shown in FIG. 2.

Figure 4:
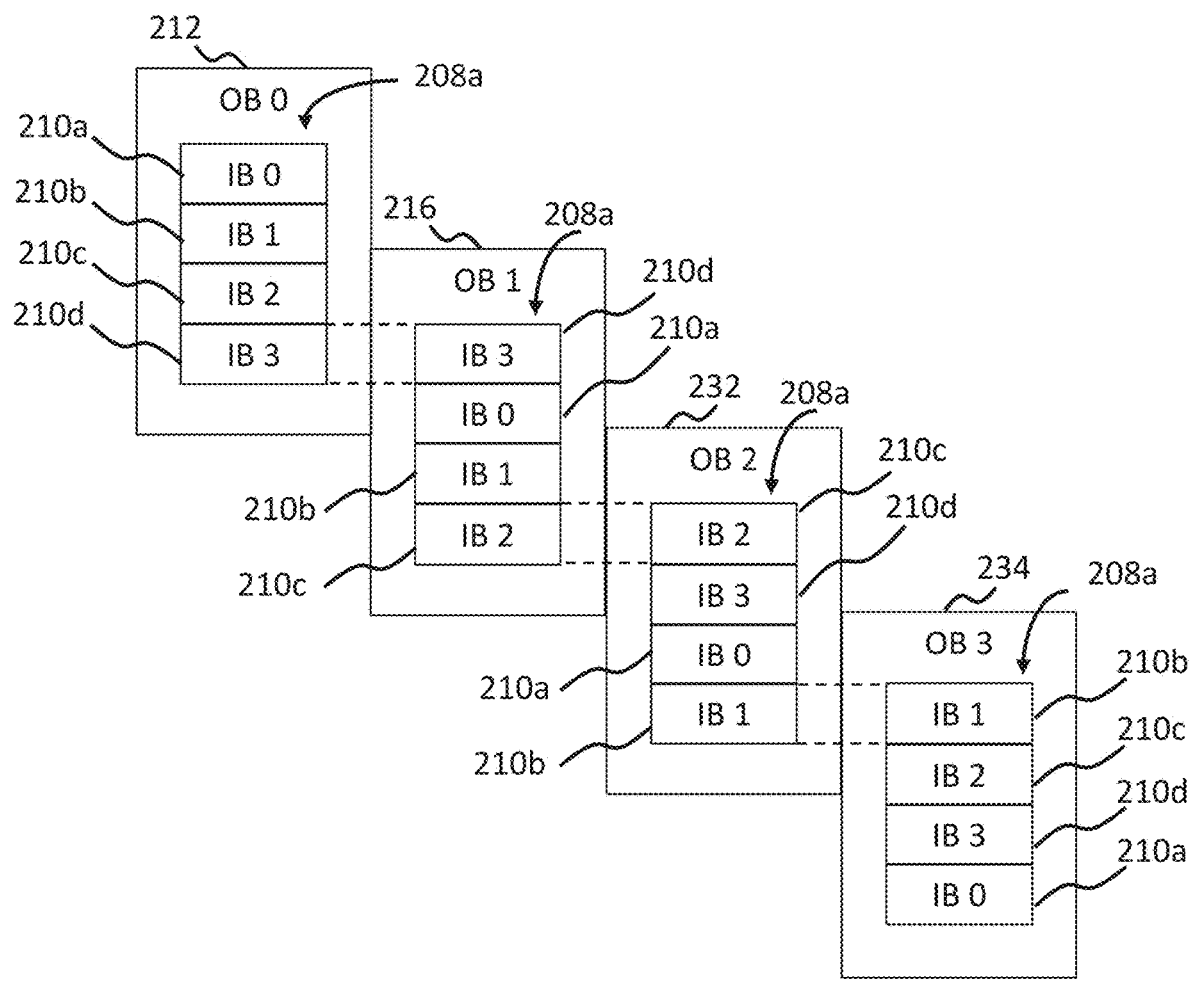
FIG. 4 is a schematic representation of re-use of blocks of neural network weights, according to examples.
Figure 5:
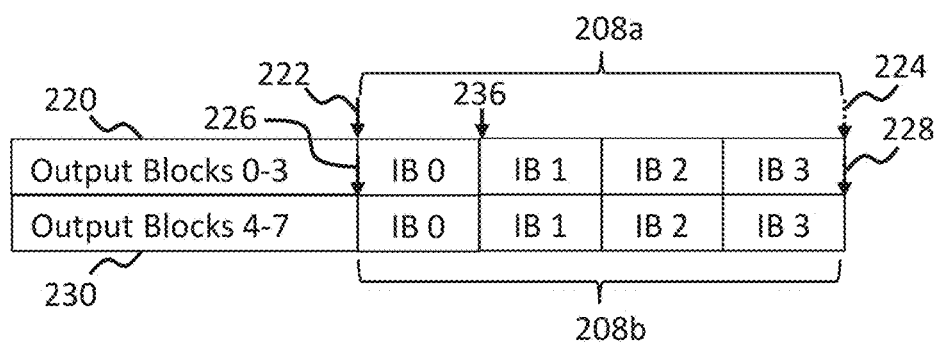
FIG. 5 is a schematic representation of blocks of neural network weights to be convolved with corresponding input blocks of a tensor to obtain particular output blocks, according to examples in accordance with FIG. 4.

To improve efficiency, decompressed weights may be stored in storage accessible to the processor, such as local storage of the processor, which may e.g. be an internal buffer of the processor, and may be referred to herein as second storage. FIG. 4 is a schematic representation of re-use of weights, according to examples, and FIG. 5 is a schematic representation of blocks of neural network weights to be convolved with corresponding input blocks of a tensor to obtain particular output blocks, according to examples in accordance with FIG. 4. Features of FIGS. 4 and 5 corresponding to features of FIGS. 1 to 3 are labelled with the same reference numerals incremented by 100; corresponding descriptions are to be taken to apply.

In the example of FIG. 4, the second storage, for storing the decompressed weights, is too small to store an entire set of decompressed neural network weight blocks. "Decompressed neural network weight blocks" are referred to in this example merely as "weight blocks", for brevity. The second storage is hence too small to store all of first to fourth weight blocks 210a-210d of a first set of weight blocks 208a (labelled IB 0 to IB 3 in FIG. 4) for convolving with corresponding blocks of a set of input blocks of a tensor to generate respective blocks of an output tensor. The second storage in this example is, however, sufficiently large to store a single weight block at a time. This is a simplified example for case of illustration, though, and in other cases the second storage may be large enough to store a plurality of weight blocks at a time. For example, in some cases, the second storage may be configured to store at least two weight blocks at a time, to allow for double-buffering so that one block can be fetched and/or decompressed while another block is being processed. In yet further examples, more than two weight blocks may be stored in the second storage at a time so that more than two weight blocks can be re-used. In the example of FIG. 4, after convolving a weight block with a corresponding input block, the weight block is either evicted from the second storage and replaced by another weight block or is re-used, and convolved with a different input block, as explained further below. In other cases, though, the second storage may be sufficiently large to store each weight block of a first set of weight blocks. In such cases, the weight blocks may be convolved with corresponding blocks of a first set of input blocks of a tensor to generate respective blocks of a first output block of an output tensor. In these cases, the first set of weight blocks may remain in the second storage after the first output block is generated, rather than being evicted. Each of the first set of weight blocks may then be convolved with a corresponding block of a second set of input blocks of the tensor to generate a second output block of the output tensor. The first set of weight blocks may remain in the storage and be re-used repeatedly to generate successive output blocks of the output tensor.

In FIG. 4, after fetching and convolving the first to fourth weight blocks 210a-210d with corresponding blocks of a first set of input blocks (such as the first to fourth blocks 106a-106d of the first set of input blocks 104a shown in FIG. 1) to generate a first output block 212 of an output tensor (labelled OB 0 in FIG. 4), the fourth weight block 210d remains in the second storage after the fourth weight block 210d is convolved with a corresponding block of the first set of input blocks. It is to be appreciated that fetching a particular weight block for example involves reading a portion of the compressed data stream corresponding to that weight block from the storage storing the compressed data stream (which may be referred to as first storage), decompressing that portion of the compressed data stream to generate decompressed data, and storing the decompressed data in the second storage for storing the weight blocks. In other cases, though, the compressed data stream and the decompressed data may be stored in the same storage.

A convolution operation is associative, meaning that an acceptable result will be obtained even if the processing order is rearranged. Hence, the weight blocks 210a-210d can be convolved with corresponding blocks of a second set of input blocks (such as the first to fourth blocks 118a-118d of the second set of input blocks 104b shown in FIG. 1) out of order, in order to generate a second output block 216 (labelled OB 1 in FIG. 4). In this case, the fourth weight block 210d (which remains in the second storage after previously being used to generate the first output block 212) is convolved with a corresponding block of the second set of input blocks before then fetching and convolving, in turn, the first to third weight blocks 210a-210c with corresponding blocks of the second set of input blocks.

It is to be appreciated that the processing of the input blocks is also performed out of order (e.g. in a reordered manner) in this example. The generation of the first output block 212 involves fetching and convolving the first to fourth weight blocks 210a-210d with, for example, the first to fourth blocks 106a-106d of the first set of input blocks 104a shown in FIG. 1. However, the generation of the second output block 216 involves fetching and convolving, in order, the fourth, first, second and third weight blocks 210d, 210a, 210b, 210c with, for example, the fourth, first, second and third blocks 118d, 118a, 118b, 118c of the second set of input blocks 104b shown in FIG. 1. In this example, the first to fourth blocks of each set of input blocks are ordered successively per input block within a tensor data stream representing the tensor 100. Hence, the processing to generate the second output block 216 begins with processing the fourth block 118d of the second set of input blocks 104b, which starts after the start of the portion of the tensor data stream representing the second set of input blocks 104b. In other words, it is necessary to locate the position within the portion of the tensor data stream that corresponds to the fourth block 118d, so as to obtain the fourth block 118d, rather than merely processing the portion of the tensor data stream from the beginning. In this example, the tensor data stream is not compressed so locating the start of the fourth block 118d is straightforward. Nevertheless, in this example, the order in which respective input blocks of the tensor data stream are accessed and convolved with corresponding weight blocks is carefully managed so that the correct input blocks are processed with the weight block(s) that are in the second storage at a given time.

This process can then be repeated to produce successive output blocks of the output tensor. For example, the third weight block 210c is the final weight block which is processed (and stored in the second storage) to generate the second output block 216. Generation of a third output block 232 (labelled OB 2 in FIG. 4) thus starts with the convolution of the third weight block 210c with a corresponding block of a third set of input blocks (a third block of the third set of input blocks in this case), so as to take advantage of the fact that the third weight block 210c is already in the storage. In other words, reading of a portion of the compressed data stream corresponding to the third output block 232 from the first storage (and decompression of that portion) can be omitted in this case, and the third weight block 210c can instead be obtained from the second storage and convolved with the corresponding block of the third set of input blocks. Processing then continues with fetching and convolving, in turn, the fourth weight block 210d and then the first and second weight blocks 210a, 210b with corresponding blocks of the third set of input blocks (in this case, the fourth block and then the first and second blocks of the third set of input blocks, where the first to fourth blocks are ordered successively within a portion of the tensor data stream corresponding to the third set of input blocks). The second weight block 210b remains in the second storage and is re-used in the generation of a fourth output block 234 (labelled OB 3 in FIG. 4). Generation of the fourth output block 234 starts with the convolution of the second weight block 210d with a corresponding block of a fourth set of input blocks (in this case, a fourth block of the fourth set of input blocks). Processing then continues with fetching and convolving, in turn, the second and third weight blocks 210c, 210d and then the first weight block 210a with corresponding blocks of the fourth set of input blocks (in this case, the second and third blocks and then the first block of the fourth set of input blocks, where the first to fourth blocks are ordered successively within a portion of the tensor data stream corresponding to the fourth set of input blocks).

In this example, reading (and decompression) of a contiguous portion of the compressed data stream representing the first to fourth weight blocks, in order, is performed linearly. However, similarly to the example of FIGS. 2 and 3, the portion is re-read from the first storage and re-decompressed repeatedly, so as to read and decompress the first set of weight blocks 208a a plurality of times. Re-reading and re-decompression of the portion can be performed as explained with reference to FIGS. 2 and 3, e.g. using position data indicative of the end of a previous portion of the compressed data stream (which corresponds to the start of the portion of the compressed data stream comprising compressed weight data representing the first set of weight blocks 208a).

The approach shown in FIG. 4 can reduce the number of memory accesses to the first storage, and may reduce the bandwidth for transferring data representing weights to the storage. For example, the generation of the first output block 212 involves the fetching of four weight blocks (which involves reading from the first storage four times). However, only three weight blocks are fetched to generate subsequent output blocks, as the final weight block for use in generation of the previous output block remains in storage and is re-used, so that reading from the first storage is performed three times instead of four.

Performing convolutions out of order in this manner may complicate the obtaining of further compressed weight data from the compressed data stream, representing a further set of weight blocks (e.g. a second set of weight blocks 208b, shown in FIG. 5). In the example of FIGS. 2 and 3, after reading a portion of the compressed data stream corresponding to a particular set of weight blocks from the first storage, that set of weight blocks is either re-read from the first storage in order to be convolved with a different set of input blocks to generate a different output block of the same set of output blocks (by reading a portion of a compressed data stream starting from a position corresponding to the start of compressed weight data representing that particular set of weight blocks), or reading of the compressed data stream from the first storage moves linearly forwards to an immediately subsequent portion, representing a further set of weight blocks, for generation of an output block of a subsequent set of output blocks. However, with the approach of FIG. 4, reading of the compressed data stream from the first storage to generate a particular output block may finish at a position which does not correspond to the end of a portion representing a set of weight blocks and the start of a further portion representing a subsequent set of weight blocks.

In the example of FIG. 4, the four output blocks 212, 216, 232, 234 correspond to a first set of four output blocks 220 (shown in FIG. 5). After generating the first set of four output blocks 220 (e.g. corresponding to a top row of output blocks in the output tensor 114 of FIG. 1 in a first x-y plane, including the first and second output blocks 112, 116, with each of the output blocks being at the same y and oz positions but a different x position), a second set of four output blocks 230 is generated (e.g. corresponding to a top row of output blocks in the output tensor 114 of FIG. 1 in a second x-y plane, at a subsequent oz position to the first x-y plane of the first set of four output blocks 120). In FIG. 4, similarly to FIG. 2, a portion of the compressed data stream comprising compressed weight data representing the first set of weight blocks 208a starts at a start position 222 within the compressed data stream and ends at an end position 224 within the compressed data stream, which corresponds to a start position 226 of a further portion of the compressed data stream, representing a second set of weight blocks 208b. The compressed weight data representing the first set of weight blocks 208a starts at the beginning of the compressed data stream, so it is straightforward to re-read the first set of weight blocks 208a from the first storage for each output block after output block 0, by starting from the beginning of the compressed data stream, as explained with reference to FIG. 2. However, it is to be appreciated that reading of respective portions of the compressed data stream corresponding to subsequent sets of weight blocks may utilize position data as explained with reference to FIG. 2 in order to identify a position within the compressed data stream corresponding to the start of a portion representing a particular set of weight blocks which is to be re-read.

The processing of FIG. 4 to generate the first set of output blocks 220 (i.e. the first to fourth output blocks 212, 216, 232, 234) finishes with the first weight block 210a in the second storage (after convolving the first weight block 210a with a corresponding block of a fourth set of input blocks). A position within the compressed data stream corresponding to an end of the first weight block 210a, which may be referred to as a finish position 236, is before the end of the portion of the compressed data stream representing the first set of weight blocks 208a, i.e. before the end position 224 representing the end of the portion of the compressed data stream. In this case, reading of the compressed data stream from the first storage linearly from the finish position 236 would cause second weight data representing the second weight block 210b to be read next. However, in this case, the generation of the second set of output blocks 230 involves the convolution of a different set of weight blocks (the second set of weight blocks 208b) than the first set of weight blocks 208a represented by a first part of the portion of the compressed data stream. In other words, it is not needed to read a second part of the portion of the compressed data stream representing the second weight block 210b, and continuing to read the compressed data stream from the finish position 236 up to the start position 226 of the further portion (representing the second set of weight blocks 208b) is unnecessary and an inefficient use of the available resources.

To address this, further position data representing the end of the portion of the compressed data stream corresponding to the first set of weight blocks 208a is stored. The further position data for example represents the end position 224 shown in FIG. 5, which in this case corresponds to the start position 226 of the further portion of the compressed data stream, representing the second set of weight blocks 208b. In these examples, both position data representing a position (e.g. the start of a portion of the compressed data stream corresponding to a particular set of weight blocks) and further position data representing a further position (e.g. the end of the portion) may be stored. In this way, the position data can be used to jump back to a prior position in the compressed data stream (e.g. corresponding to the start of the portion) so as to re-read a previously read portion, and to jump forward in the compressed data stream (e.g. to the end of the portion, which for example corresponds to the start of a further portion immediately subsequent to the portion) so as to move on to reading the further portion corresponding to a subsequent set of weight blocks without reading an intervening section of the compressed data stream.

In some cases in accordance with any of the examples herein, a data generation indicator may be generated (e.g. by the processor) indicating whether the position data has been generated for the position and/or whether the further position data has been generated for the further position. For example, the data generation indicator may be a Boolean value that records whether the position data and/or the further position data has been previously saved, in order to avoid unnecessarily repeatedly storing the same data. In these examples, a determination of whether to generate the position data and/or the further position data may be made based on the data generation indicator.

In the examples of FIGS. 3 to 5, the input blocks are all different sizes due to variable compression and, by extension, the output blocks are also all different sizes. In these examples, the input blocks are tightly packed, so that the end of one input block coincides with the start of the subsequent input block and so on. As the size of each input block is different, each input block starts at an effectively random position within the compressed data stream due to the tight packing of the blocks and the variable compression. However, as explained above, the position of a given input block within the compressed data stream can be determined straightforwardly in examples herein, using the position data. As discussed above, in alternative approaches, input blocks may be sparsely packed so as to regularly distribute the input blocks within the compressed data stream (e.g. so that each input block starts N bytes after the start of the previous input block). However, this increases storage requirements for the compressed data stream compared to dense packing of the input blocks.

Although the examples of FIGS. 1 to 5 are described with reference to processing of data to implement a neural network, it is to be appreciated that these are merely illustrative, and the methods herein may be used to process data of various types and/or to perform various other types of processing.

Figure 6:
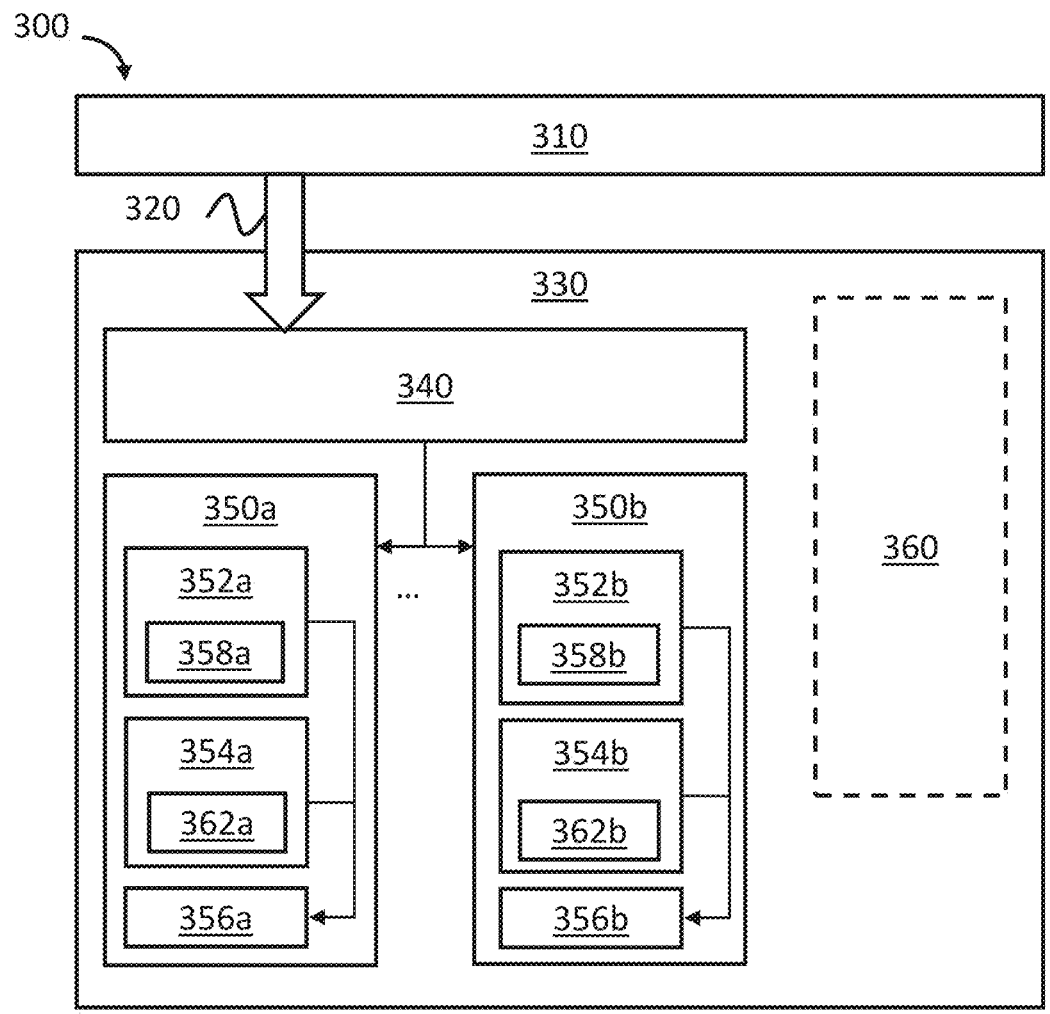
FIG. 6 is a schematic diagram of a data processing system, according to examples.

The methods herein may be implemented using a processor that provides dedicated circuitry that can be used to perform operations which would normally be undertaken by dedicated hardware accelerators, such as a neural processing unit (NPU) and a graphics processing unit (GPU). FIG. 6 shows schematically an example of a data processing system 300 including such a processor 330. It will be appreciated that the types of hardware accelerator which the processor 330 may provide dedicated circuitry for is not limited to that of an NPU or GPU but may be dedicated circuitry for any type of hardware accelerator. GPU shader cores may be well-suited for performing certain types of arithmetic operations such as neural processing operations, as these operations are generally similar to the arithmetic operations that may be required when performing graphics processing work (but on different data). Furthermore, graphics processors typically support high levels of concurrent processing (e.g. supporting large numbers of execution threads), and are optimized for data-plane (rather than control plane) processing, all of which means that graphics processors may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 330 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 6, the processor 330 is arranged to receive a command stream 320 from a host processor 310, such as a CPU. The command stream comprises at least one command in a given sequence, each command to be executed, and each command may be decomposed into a number of tasks, such as the tasks discussed in examples above. These tasks may be self-contained operations, such as a given machine learning operation or a graphics processing operation. It will be appreciated that there may be other types of tasks depending on the command.

The command stream 320 is sent by the host processor 310 and is received by a command processing unit 340 which is arranged to schedule the commands within the command stream 320 in accordance with their sequence. The command processing unit 340 is arranged to schedule the commands and decompose each command in the command stream 320 into at least one task. Once the command processing unit 340 has scheduled the commands in the command stream 320, and generated a plurality of tasks for the commands, the command processing unit issues each of the plurality of tasks to at least one compute unit 350a, 350b each of which are configured to process at least one of the plurality of tasks.

The processor 330 comprises a plurality of compute units 350a, 350b. Each compute unit 350a, 350b, may be a shader core of a GPU specifically configured to undertake a number of different types of operations, however it will be appreciated that other types of specifically configured processor may be used, such as a general-purpose processor configured with individual compute units, such as compute units 350a, 350b. Each compute unit 350a, 350b comprises a number of components, and at least a first processing module 352a, 352b for executing tasks of a first task type, and a second processing module 354a, 354b for executing tasks of a second task type, different from the first task type. In some examples, the first processing module 352a, 352b may be a processing module for processing neural processing operations, such as those which would normally be undertaken by a separate NPU. In these cases, the first processing module 352a, 352b is for example a neural engine. Similarly, the second processing module 354a, 354b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 340 issues tasks of a first task type to the first processing module 352a. 352b of a given compute unit 350a, 350b, and tasks of a second task type to the second processing module 354a, 354b of a given compute unit 350a, 350b. The command processing unit 340 would issue machine learning/neural processing tasks to the first processing module 352a, 352b of a given compute unit 350a, 350b where the first processing module 352a, 352b is optimized to process neural network processing tasks, for example by comprising an efficient means of handling a large number of multiply-accumulate operations. Similarly, the command processing unit 340 would issue graphics processing tasks to the second processing module 354a. 354b of a given compute unit 350a. 350b where the second processing module 352a, 354a is optimized to process such graphics processing tasks.

In addition to comprising a first processing module 352a, 352b and a second processing module 354a, 354b, each compute unit 350a, 350b also comprises a memory in the form of a local cache 356a, 356b for use by the respective processing module 352a, 352b, 354a, 354b during the processing of tasks. Examples of such a local cache 356a, 356b is a L1 cache. The local cache 356a, 356b may, for example, a synchronous dynamic random-access memory (SDRAM). For example, the local cache 356a, 356b may comprise a double data rate synchronous dynamic random-access memory (DDR-SDRAM). It will be appreciated that the local cache 356a, 356b may comprise other types of memory.

The local cache 356a, 356b is used for storing data relating to the tasks which are being processed on a given compute unit 350a, 350b by the first processing module 352a, 352b and second processing module 354a, 354b. It may also be accessed by other processing modules (not shown) forming part of the compute unit 350a, 350b the local cache 356a, 356b is associated with. However, in some examples it may be necessary to provide access data associated with a given task executing on a processing module of a given compute unit 350a. 350b to a task being executed on a processing module of another compute unit (not shown) of the processor 330. In such examples, the processor 330 may also comprise storage 360, for example a cache, such as an L2 cache, for providing access to data used for the processing of tasks being executed on different compute units 350a. 350b.

By providing a local cache 356a, 356b tasks which have been issued to the same compute unit 350a, 350b may access data stored in the local cache 356a, 356b, regardless of whether they form part of the same command in the command stream 320. The command processing unit 340 is responsible for allocating tasks of commands to given compute units 350a, 350b such that they can most efficiently use the available resources, such as the local cache 356a, 356b, thus reducing the number of read/write transactions required to memory external to the compute units 350a. 350b, such as the storage 360 (L2 cache) or higher level memories. One such example, is that a task of one command issued to a first processing module 352a of a given compute unit 350a, may store its output in the local cache 356a such that it is accessible by a second task of a different (or the same) command issued to a given processing module 352a, 354a of the same compute unit 350a. The compressed data stream may be stored in the local cache 356a, 356b or in the storage 360, or another storage accessible to the processor 330 for example.

The first processing module 352a, 352b has internal storage 358a, 358b, which is for example a buffer for storing data internally to the first processing module 352a, 352b during performance of a task by the first processing module 352a, 352b. The second processing module 354a, 354b similarly has internal storage 362a, 362b, which is also for example a buffer. The storage for storing at least part of the decompressed data (generated by decompressing a portion of a compressed data stream, and which may be referred to as second storage in some examples) is for example one of the internal storages 358a, 358b, 362a, 362b.

One or more of the command processing unit 340, the compute units 350a, 350b, and the storage 360 may be interconnected using a bus. This allows data to be transferred between the various components. The bus may be or include any suitable interface or bus. For example, an ARM® Advanced Microcontroller Bus Architecture (AMBAR) interface, such as the Advanced extensible Interface (AXI), may be used.

Figure 7:
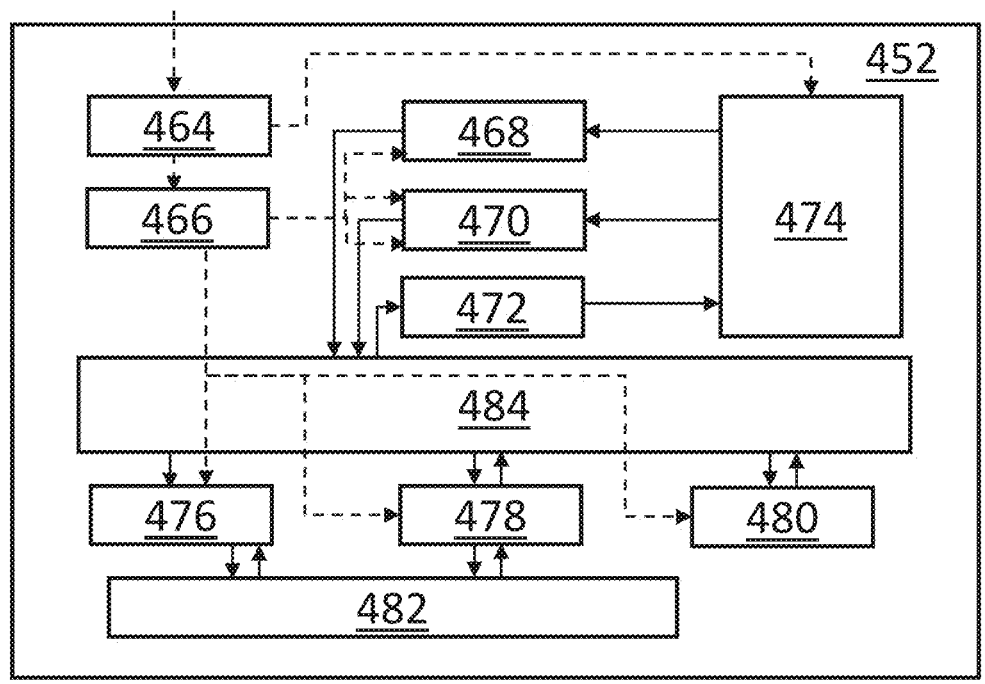
FIG. 7 is a schematic diagram of a neural engine, according to examples.

FIG. 7 is a schematic diagram of a neural engine 452, which in this example is used as a first processing module 352a. 352b in a data processing system 300 in accordance with FIG. 6. The neural engine 452 includes a command and control module 464. The command and control module 464 receives tasks from the command processing unit 340 (shown in FIG. 6), and also acts as an interface to storage external to the neural engine 452 (such as a local cache 356a, 356b and/or a L2 cache 360) which is referred to in this example as first storage, and is arranged to store data to be processed by the neural engine 452 such as data representing a tensor or a stripe of a tensor, or data representing neural network weights. The data may comprise a compressed data stream, e.g. representing neural network weights as described with reference to FIGS. 1 to 5. The first storage may additionally store other data to configure the neural engine 452 to perform particular processing and/or data to be used by the neural engine 452 to implement the processing such as neural network weights.

The command and control module 464 interfaces to a handling unit 466, which is for example a traversal synchronization unit (TSU). In this example, each task corresponds to a stripe of a tensor, which is to be convolved with weights represented by a compressed data stream to implement a layer of a neural network. In this example, the handling unit 466 splits data representing a stripe of a tensor into a plurality of blocks of data, each of which represents a respective part of the tensor. The handling unit 466 also obtains, from storage external to the neural engine 452 such as the L2 cache 360, an operation set comprising a plurality of operations. In this example, the operations are a chain of operations, representing a sequence of layers of the neural network. A block of data is allocated as an input to one of the operations by the handling unit 466. The handling unit 466 may alter the order of processing of blocks of data (and, in some cases, the order of processing of respective portions of a given block), rather than reading each block from the start, in order, as explained further with reference to FIG. 4. The handling unit 466 also generates the position data and, in some cases, further position data described in any of the examples herein. The handling unit 466 can then use the position data and/or the further position data to control the reading of appropriate portions of the compressed data stream from the first storage, which as explained above is e.g. storage external to the neural engine 452, such as the L2 cache 360 or the local cache 356a, 356b.

The handling unit 466 coordinates the interaction of internal components of the neural engine 452, which include a weight fetch unit 468, an input reader 470, an output writer 472, a direct memory access (DMA) unit 474, a dot product unit (DPU) array 476, a vector engine 478, a transform unit 480, an accumulator buffer 482, and the storage 484, for processing of blocks of data. The data dependencies across the functional units are tracked by the handling unit 466. Processing is initiated by the handling unit 466 in a functional unit if all input blocks are available and space is available in the storage 484 of the neural engine 452. The storage 484 may be considered to be a shared buffer, in that various functional units of the neural engine 452 share access to the storage 484.

In examples in which the compressed data stream represents weights, the weight fetch unit 468 reads, in turn, respective portions of the compressed data stream from external storage, based on the position data and/or the further position data, e.g. as described with reference to any of FIGS. 1 to 5. The weight fetch unit 468 decompresses the portions of the compressed data stream to generate decompressed data. At least part of the decompressed data, e.g. representing at least part of a set of weight blocks, is stored in the storage 484, which is referred to as second storage in some examples herein. The weight fetch unit 468 for example includes a suitable decompression unit (not shown in FIG. 7) to decompress received portions of the compressed data stream.

The input reader 470 reads data to be processed by the neural engine 452 from external storage, such as a block of data representing part of a tensor. The output writer 472 writes output data obtained after processing by the neural engine 452 to external storage, such as output data representing at least part of an output feature map obtained by processing a corresponding at least part of an input feature map by the neural network represented by the weights fetched by the weight fetch unit 468. The weight fetch unit 468, input reader 470 and output writer 472 interface with the external storage (such as the local cache 356a, 356b, which may be a L1 cache such as a load/store cache, and/or the L2 cache 360) via the DMA unit 474.

The weights and block(s) of data are processed by the DPU array 476, vector engine 478 and transform unit 480 to generate output data which is written out to external storage (such as the local cache 356a, 356b or the L2 cache 360) by the output writer 472. The DPU array 476 is arranged to efficiently calculate a dot product between two operands, such as between an array of weights and a corresponding block of data (e.g. representing part of a tensor). The vector engine 478 is arranged to perform elementwise operations, for example to apply scale parameters to scale an output of a dot product calculated by the DPU array 476. Data generated during the course of the processing performed by the DPU array 476 and the vector engine 478 is stored temporarily in the accumulator buffer 482, from where it may be retrieved by either the DPU array 476 or the vector engine 478 for further processing as desired.

The transform unit 480 is arranged to perform in-block transforms such as dimension broadcasts or axis swaps. The transform unit 480 obtains data from the storage 484 (e.g. after processing by the DPU array 476 and/or vector engine 478) and writes transformed data back to the storage 484.

Figure 8:
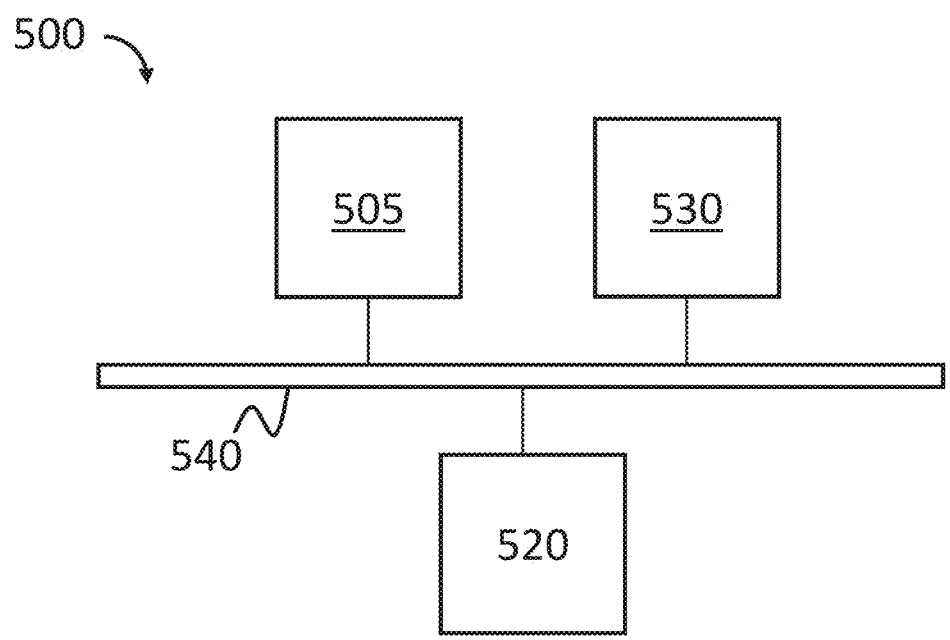
FIG. 8 is a schematic diagram of a system comprising features according to examples.

FIG. 8 shows schematically a system 500 for allocating tasks associated with commands in a sequence of commands.

The system 500 comprises host processor 505 such as a central processing unit, or any other type of general processing unit. The host processor 505 issues a command stream comprising a plurality of commands, each having a plurality of tasks associated therewith.

The system 500 also comprises a processor 530, which may be similar to or the same as the processor 330 of FIG. 6. The processor 530 comprises at least a plurality of compute units 350a, 350b and a command processing unit 340. Each compute unit may comprise a plurality of processing modules each configured to perform at least one type of operation. The system 500 may also include at least one further processor (not shown), which may be the same as the processor 530. The processor 530, and the host processor 505 may be combined as a System on Chip (SoC) or onto multiple SoCs to form one or more application processors.

The system 500 also comprises memory 520 for storing data generated by the tasks externally from the processor 530, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 350a. 350b of a processor 530 so as to maximize the usage of the local cache 356a, 356b.

In some examples, the system 500 may comprise a memory controller (not shown), which may be a dynamic memory controller (DMC). The memory controller is coupled to the memory 520. The memory controller is configured to manage the flow of data going to and from the memory. The memory may comprise a main memory, otherwise referred to as a 'primary memory'. The memory may be an external memory, in that the memory is external to the system 500. For example, the memory 520 may comprise 'off-chip' memory. The memory may have a greater storage capacity than local caches of the processor 530 and/or the host processor 505. In some examples, the memory 520 is comprised in the system 500. For example, the memory 520 may comprise 'on-chip' memory. The memory 520 may, for example, comprise a magnetic or optical disk and disk drive or a solid-state drive (SSD). In some examples, the memory 520 comprises a synchronous dynamic random-access memory (SDRAM). For example, the memory 520 may comprise a double data rate synchronous dynamic random-access memory (DDR-SDRAM).

One or more of the host processor 505, the processor 530, and the memory 520 may be interconnected using a system bus 540. This allows data to be transferred between the various components. The system bus 540 may be or include any suitable interface or bus. For example, an ARM® Advanced Microcontroller Bus Architecture (AMBAR) interface, such as the Advanced extensible Interface (AXI), may be used.

The above examples are to be understood as illustrative examples. Further examples are envisaged. Although the examples above are described with reference to processing of data to implement a neural network, it is to be appreciated that these examples are merely illustrative, and the methods herein may be used in the processing of data of various types and/or in the performance of various other types of processing, different from neural network processing.

The example of FIG. 6 includes a processor 330 that provides dedicated circuitry that can be used to perform operations which would normally be undertaken by dedicated hardware accelerators, such as a neural processing unit (NPU) and a graphics processing unit (GPU). However, in other examples, the methods herein may be implemented using a different processor, such as a processor providing dedicated circuitry to perform the methods herein. For example, the methods herein may be implemented using an appropriately configured hardware accelerator, such as an NPU or a GPU, dedicated to performing a particular type of task.

It to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor to:
   generate position data indicative of a position within a compressed data stream, wherein, previously, in executing a task, data of the compressed data stream ending at the position has been read by the processor from storage storing the compressed data stream;
   after reading the data of the compressed data stream, read further data of the compressed data stream from the storage, in executing the task, the further data located beyond the position within the compressed data stream;
   after reading the further data, read, based on the position data, a portion of the compressed data stream from the storage, in executing the task, starting from the position within the compressed data stream; and
   decompress the portion of the compressed data stream to generate decompressed data, in executing the task.

2. The processor according to claim 1, wherein the data comprises a prior portion of the compressed data stream, immediately prior to the portion of the compressed data stream, and the position corresponds to an end of the prior portion of the compressed data stream such that the end of the prior portion of the compressed data stream coincides with a start of the portion of the compressed data stream.

3. The processor according to claim 2, wherein the further data comprises the portion of the compressed data stream and the processor is to:
   read the prior portion of the compressed data stream from the storage to read the data from the storage; and
   continue reading the compressed data stream from the end of the prior portion of the compressed data stream to read the further data from the storage.

4. The processor according to claim 1, wherein the processor is to, after reading the portion of the compressed data stream, generate further position data indicative of a further position within the portion of the compressed data stream, for use in reading, from the storage, a further portion of the compressed data stream immediately subsequent to the portion of the compressed data stream, such that an end of the portion of the compressed data stream corresponds to a start of the further portion of the compressed data stream.

5. The processor according to claim 4, wherein the further position corresponds to the end of the portion of the compressed data stream and the processor is to:
   re-read part of the portion of the compressed data stream from the storage, up to a finish position that is before the end of the portion of the compressed data stream; and
   subsequently, read the further portion from the storage based on the further position data, starting from the start of the further portion of the compressed data stream.

6. The processor according to claim 1, wherein the compressed data stream is compressed with a variable encoding rate.

7. The processor according to claim 1, wherein the storage is first storage, and the processor is to store the decompressed data in second storage, and wherein a size of the second storage is less than a size of the decompressed data.

8. The processor according to claim 1, wherein the storage is first storage and the processor is to:
store at least a part of the decompressed data in second storage; and
read the part of the decompressed data from the second storage a plurality of times over a time period, without reading a part of the portion of the compressed data stream corresponding to the part of the decompressed data from the first storage in the time period.

9. The processor according to claim 1, wherein the compressed data stream comprises compressed weight data representative of neural network weights, and the task comprises a neural processing task.

10. The processor according to claim 9, wherein the processor is to, in executing the task:
obtain tensor data representative of at least a part of a multi-dimensional tensor; and
process the decompressed data with the tensor data to convolve at least the part of the multi-dimensional tensor with corresponding weights of the neural network weights.

11. The processor according to claim 1, wherein the decompressed data comprises first weight data representing a first part of a set of decompressed neural network weight blocks, and the processor is to, in executing the task:
process the first weight data with first tensor data representing a first part of a set of blocks of a multi-dimensional tensor, to convolve a respective weight block of the first part of the set of decompressed neural network weight blocks with a corresponding input block of the first part of the set of blocks of the multi-dimensional tensor, wherein each block of the set of blocks of the multi-dimensional tensor is at a first location in a first dimension of the multi-dimensional tensor.

12. The processor according to claim 11, wherein the storage is first storage and the processor is to, in executing the task:
store the first weight data in second storage, the first weight data corresponding to a part of the decompressed data;
replace, in the second storage, the first weight data with second weight data corresponding to a further part of the decompressed data, the second weight data representing a second part of the set of decompressed neural network weight blocks;
read the second weight data from the second storage; and
process the second weight data with second tensor data representing a second part of the set of blocks of the multi-dimensional tensor, to convolve a respective weight block of the second set of decompressed neural network weight blocks with a corresponding input block of the second part of the set of blocks of the multi-dimensional tensor.

13. The processor according to claim 12, wherein the processor is to, in executing the task, after processing the second weight data with the second tensor data:
read the second weight data from the second storage; and
process the second weight data with third tensor data representing at least a part of a further set of blocks of the multi-dimensional tensor, to convolve a respective weight block of the second set of decompressed neural network weight blocks with a corresponding input block of the part of the further set of blocks of the multi-dimensional tensor, wherein each block of the further set of blocks of the multi-dimensional is at a second location in the first dimension of the multi-dimensional tensor.

14. The processor according to claim 13, wherein, to process the second weight data with the third tensor data, the processor is to obtain a second portion of a tensor data stream representative of at least the further set of blocks of the multi-dimensional tensor, the second portion of the tensor stream comprising the third tensor data and being subsequent to a first portion of the tensor data stream within the tensor data stream, for convolving a respective input block of the part of the further set of blocks of the multi-dimensional tensor represented by the third tensor data with a corresponding weight block of the second set of decompressed neural network weight blocks.

15. The processor according to claim 1, wherein the processor is to generate the position data after reading the data ending at the position for a first time, without having read the data ending at the position before the first time.

16. The processor according to claim 1, wherein the processor is to generate the position data in response to determining, based on a data generation indicator indicative of whether the position data has previously been generated for the position, that the position data has not previously been generated for the position.

17. The processor according to claim 1, comprising local storage, wherein the processor is to store at least part of the decompressed data in the local storage.

18. A method comprising:
generating position data indicative of a position within a compressed data stream, wherein, previously, in executing a task, data of the compressed data stream ending at the position has been read from storage storing the compressed data stream;
after reading the data of the compressed data stream, reading further data of the compressed data stream from the storage, in executing the task, the further data located beyond the position within the compressed data stream;
after reading the further data, reading, based on the position data, a portion of the compressed data stream from the storage, in executing the task, starting from the position within the compressed data stream; and
decompressing the portion of the compressed data stream to generate decompressed data, in executing the task.

19. The method of claim 18, wherein the data comprises a prior portion of the compressed data stream, immediately prior to the portion of the compressed data stream, the position corresponds to an end of the prior portion of the compressed data stream such that the end of the prior portion of the compressed data stream coincides with a start of the portion of the compressed data stream, and the further data comprises the portion of the compressed data stream and method further comprises:
reading the prior portion of the compressed data stream from the storage to read the data from the storage; and
continuing reading the compressed data stream from the end of the prior portion of the compressed data stream to read the further data from the storage.

20. A non-transitory computer-readable storage medium comprising a set of computer-readable instructions stored thereon which, when executed by at least one processor, are arranged to cause the at least one processor to:
generate position data indicative of a position within a compressed data stream, wherein, previously, in executing a task, data of the compressed data stream ending at the position has been read by the processor from storage storing the compressed data stream;

after reading the data of the compressed data stream, read further data of the compressed data stream from the storage, in executing the task, the further data located beyond the position within the compressed data stream;

after reading the further data, read, based on the position data, a portion of the compressed data stream from the storage, in executing the task, starting from the position within the compressed data stream; and decompress the portion of the compressed data stream to generate decompressed data, in executing the task.

\* \* \* \* \*